No. 11,864. Reissued Oct. 9, 1900.
P. E. SHIRK.
MACHINE FOR CUTTING CIGAR WRAPPERS.
(Application filed July 31, 1900.)
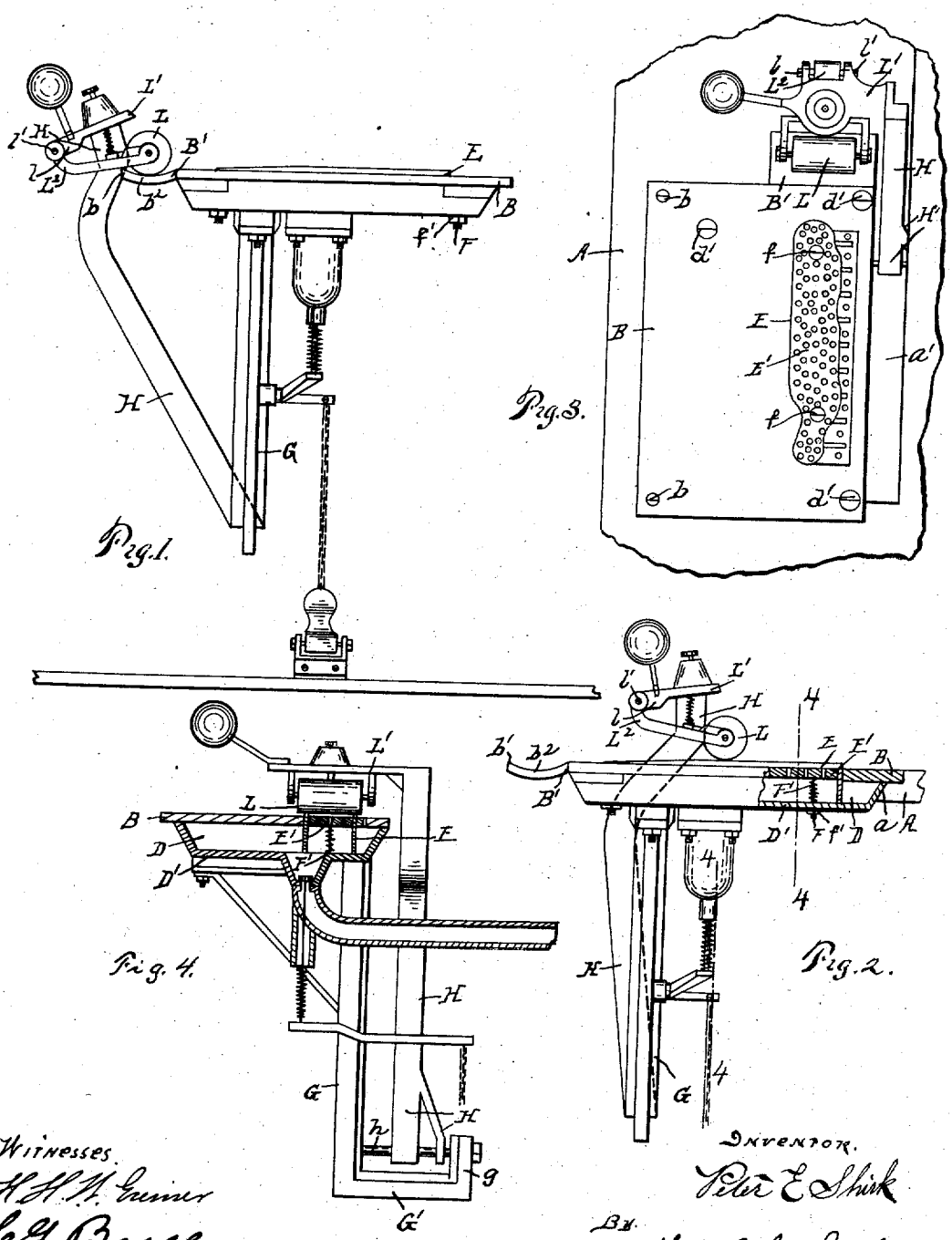
Witnesses.
H. H. Turner
C. G. Bassler.
Inventor.
Peter E. Shirk
By
Wm. R. Gerhart
Attorney.

UNITED STATES PATENT OFFICE.

PETER E. SHIRK, OF BLUE BALL, PENNSYLVANIA, ASSIGNOR TO THE JOHN A. PEEPLES MANUFACTURING COMPANY, OF LANCASTER, PENNSYLVANIA.

MACHINE FOR CUTTING CIGAR-WRAPPERS.

SPECIFICATION forming part of Reissued Letters Patent No. 11,864, dated October 9, 1900.

Original No. 633,162, dated September 19, 1899. Application for reissue filed July 31, 1900. Serial No. 25,471.

*To all whom it may concern:*

Be it known that I, PETER E. SHIRK, a citizen of the United States, residing at Blue Ball, county of Lancaster, State of Pennsylvania, have invented certain Improvements in Machines for Cutting Cigar-Wrappers, of which the following is a specification.

This invention relates to that class of machines for cutting cigar-wrappers wherein the leaf is held by suction or air-pressure to a diaphragm or platen while the wrapper is being cut from said leaf; and the objects of my improvements are, first, to produce a machine for cutting cigar-wrappers and that shall be more simple in construction, cheaper, and more convenient to operate than those now in use; second, to so construct the machines that any required number of the same may be placed in a row on a cigar-maker's bench; third, to provide for rolling the bunch in the wrapper without removing said wrapper from the position occupied thereby when it is cut, and, fourth, to automatically retract the roller after the wrapper is cut by the same mechanism that pressed said roller down on the cutting-blade.

The invention consists in the construction and combination of the various parts, as hereinafter fully described and then pointed out in the claims.

In the accompanying drawings, which form a part of this specification, Figure 1 is a side view of a machine embodying my invention, showing the roller in its normal position; Fig. 2, a similar view, but with the roller in its operating position, parts of the machine being cut away; Fig. 3, a top plan view showing a portion of a cigar-maker's bench, the roller being in the position occupied thereby in Fig. 1; and Fig. 4, a transverse section of the machine, taken on broken line 4 4 of Fig. 2.

Similar letters indicate like parts throughout the several views.

Referring to the details of the drawings, A indicates a cigar-maker's bench, and B the bed-plate of the machine, set in the bench and secured thereto by screws *b* and over an opening therein, the wall of which is indicated by *a* in Fig. 2, the upper face of the bed-plate being approximately in the same plane with the top of said bench. On the rear side of one end of bed-plate B is a somewhat downwardly-extending lip B′, having its outer end *b′* upturned, so as to form a slight pocket $b^2$ for a purpose to be described.

D indicates an exhaust-chamber, the walls *d* whereof form a rectangular box which is located in bench-opening *a* and secured to the under face of bed-plate B by screws *d′*. Bed-plate B has an opening conforming in shape with a continuous endless cutting-blade E of the form of a cigar-wrapper, the back of which blade rests on the bottom D′ of the exhaust-chamber and the cutting edge of which extends slightly above bed-plate B. In the space surrounded by blade E is a perforated diaphragm or platen E′, set slightly below the cutting edge of blade E and secured by screws *f* to the upper ends of rods F, located near the ends of said space and passing down through the bottom D′ of the exhaust-chamber. Surrounding each rod F is a coiled spring F′, having one end thereof bearing against the under side of platen E′ and the other end on the bottom of the exhaust-chamber, the upward movement of rods F and platen E′ being limited by nuts *f′* on the ends of rods F, projecting below bottom D′, which ends are threaded.

G indicates a hanger secured to the rear side of the bottom of the exhaust-chamber, and on the lower end of the hanger is a rearwardly-extending horizontal bracket G′, having an outer upturned end *g*, in which upturned end and hanger G is secured a hinge-rod *h*, whereon is hinged the lower ends of jaws H′ of lever H, the upper end whereof carries the pressure-roller L, attached thereto, as I am about to describe. Lever H extends upward from bracket G′ through a slot *a′* in said bench A, and above that bench and on said upper end of lever H is a bracket L′, extending inward over bed-plate B, and bracket L′ has formed thereon jaws *l*, extending outward at right angles therewith. Bracket L′ slopes somewhat downward and outward transversely, and jaws *l* continue the slope, and in the outer ends of said jaws is supported a hinge-rod *l′*, whereon is hinged a lever $L^2$, extending inward beneath and beyond bracket L′ and having on its inner end jaws $l^2$, wherein is journaled said pressure-roller L. On bracket L′ is a socket M, passing uprightly through which is a rod M′, having its lower end secured to lever $L^2$. On the upper end of rod M′ is a head *m*, that limits the depression of roller L, caused by a spring *m′*, coiled around said rod and having one end bearing on lever $L^2$ and the other end against the top of socket M. Bracket L′ extends beyond arms *l* and has on its free end an upright handhold $M^2$.

Beneath and opening into the exhaust-chamber is a valve-chamber N, in the bottom whereof is the seat *n* of a puppet-valve I, and beneath the valve-seat chamber N is connected with an exhaust-pipe P, which may be one of a number connecting as many machines with a main exhaust-pipe (not shown) extending along behind the cigar-maker's bench. The stem I′ of valve I passes down through the lower part of the valve-chamber, and below the same there is a spring *i*, coiled around said stem, the spring having its upper end bearing against the bottom of the valve-chamber and its lower end on a pin *i′*, passing through the stem. Bearing against the lower end of the valve-stem is the arm R of a lever R R′, fulcrumed at *r* to hanger G, the arm R′ being connected with a treadle T by a chain *t*.

Along and outside of the rear portion of cutting-blade E are a series of perforations S through bed-plate B and leading into exhaust-chamber D, and valve-chamber N is so located as to open both into the space surrounded by said cutting-blade and into the space between the cutting-blade and the front portion of wall *d*, as is shown in Fig. 4, whereby when valve I is opened the air is exhausted from both of those spaces, so that atmospheric pressure is induced on the portion of the tobacco-leaf-covering platen E′ and that extending back of cutting-blade E and over perforations.

V indicates the front of the cigar-maker's bench, so that bed-plate B is located between the operator and lever H. The pressure-roller L normally rests in pocket $b^2$ of lip B′, and, as shown in Figs. 1 and 3, cutting-blade E slopes upward from the end adjacent to said lip to near the center of its own length, as shown at *t′*, and from that point to its other end the edge of said blade is horizontal.

In operating the tobacco-leaf is spread over the platen and over the perforations S of bed-plate B. The valve I is raised and as soon as atmospheric pressure is induced on said leaf the operator grasps handhold $M^2$ and pushes the pressure-roller over cutting-blade E, when, loosening his grasp of handhold $M^2$, he takes a bunch and at once proceeds to roll the same in the newly-cut wrapper. The inclined position of rod M′ and the reaction from the pressure of spring *m′*, coiled around said rod, on pressure-roller L automatically force the vibrating end of lever H back toward lip B′ of bed-plate B, the movement being aided by slope *t′* of the cutting-blade, where the reaction is somewhat lessened. When the roller L reaches pocket $b^2$, its return movement is stopped by upturned end *b′* of lip B′. By reason of the curved surface of end *b′* the stoppage of roller L is gradual, and consequently easier on the mechanism than would be the case were the roller to be stopped by a square shoulder.

Cutters embodying my invention are made for rolling the cigars either from the right or from the left. In both cases the lip B′ and the pressure-roller L are located at the end of bed-plate B opposite the end of the endless cutting-blade at which was begun the rolling of the bunch in the wrapper. In the drawings a right-hand machine is shown, said lip B′ and the pressure-roller being to the left of the operator and the rolling of the bunch in the wrapper beginning to the right of said operator.

I do not restrict myself to the details of construction herein shown and described, as it is obvious that many alterations may be made therein without departing from the principle and scope of my invention.

Having thus described my invention, what I claim as new, and desire to secure by Letters Patent, is—

1. The combination of an exhaust-chamber, a continuous endless cutting-blade resting on the bottom of said chamber, a perforated platen in the space surrounded by the cutting-blade, a bed-plate covering the exhaust-chamber and through an opening in which the endless blade passes, said bed-plate having perforations therethrough and adjacent to the outer face of said blade, and a valve-chamber opening into the bottom of the exhaust-chamber beneath the space surrounded by said blade and beneath the space between the cutting-blade and the outer wall of the exhaust-chamber, for the purpose specified.

2. The combination of a bed-plate, a cutting-blade projecting above the bed-plate, a concave lip formed on an end of the bed-plate, a lever, and a pressure-roller carried by said lever, the upturned extremity of said lip being adapted to limit the return movement of said roller, for the purpose specified.

3. The combination of a bed-plate, a cutting-blade projecting above the bed-plate, a concave lip formed on an end of the bed-plate, a lever, and a pressure-roller carried by said lever and resting normally in said concave lip, the upturned extremity of said lip being adapted to limit the return movement of said roller, for the purpose specified.

4. The combination of a cigar-maker's bench, a bed-plate having its upper surface approximately flush with the top of said bench, an exhaust-chamber secured to the under side of the bed-plate, a continuous endless cutting-blade resting on the bottom of said chamber and extending up through a similarly-shaped opening in said bed-plate and slightly above the same, a perforated platen in the space surrounded by the cutting-blade, the bed-plate having perforations therein adjacent to an outer face of said cutting-blade, a valve-chamber opening into the bottom of the exhaust-chamber beneath the space surrounded by said blade and beneath the space between the cutting-blade and the outer wall of the exhaust-chamber, a concave lip formed on the end of the bed-plate, a lever, and a pressure-roller carried by said lever and resting normally in said concave lip, the upturned extremity of said lip being adapted to limit the return movement of said roller, for the purpose specified.

5. The combination of a bed-plate, a cutting-blade projecting above the bed-plate, a lever, a bracket on the swinging end of the lever, jaws extending outward from the bracket, a roller-carrying lever fulcrumed between said jaws and extending inward beneath said bracket, a pressure-roller journaled in the inner end of the roller-carrying lever, an upright rod on the roller-carrying lever and located between the pressure-roller and the fulcrum of said lever, said rod being inclined outward from the pressure-roller, and a spring on the upright rod, and bearing on the roller-carrying lever, for the purpose specified.

6. The combination of a bed-plate, a lever, a bracket on the swinging end of the lever, jaws extending outward from the bracket, a roller-carrying lever fulcrumed between said jaws and extending inward beneath said bracket, a pressure-roller journaled in the inner end of the roller-carrying lever, an upright rod on the roller-carrying lever and located between the pressure-roller and the fulcrum of said lever, said rod being inclined outward from the pressure-roller, a spring on the upright rod and bearing on the roller-carrying lever, and a cutting-blade projecting above the bed-plate and having the edge sloping downward from toward the center thereof to the end adjacent to the position normally occupied by the pressure-roller, for the purpose specified.

7. The combination of a bed-plate, a cutting-blade projecting above the bed-plate, a lever pivoted in a vertical transverse plane through the cutting-blade, a bracket on the swinging end of the lever, jaws extending outward from the bracket, a roller-carrying lever fulcrumed between said jaws and extending inward beneath said bracket, a pressure-roller journaled in the inner end of the roller-carrying lever, an upright rod on the roller-carrying lever and located between the pressure-roller and the fulcrum of said lever, said rod being inclined outward from the pressure-roller, and a spring on the upright rod and bearing on the roller-carrying lever, for the purpose specified.

8. The combination of a bed-plate having a concave lip on one end, a cutting-blade projecting above the bed-plate and having the edge sloping downward from toward the center thereof to the end adjacent to the concave lip, a lever pivoted in a vertical transverse plane through the cutting-blade, a bracket on the swinging end of the lever, jaws extending outward from the bracket, a roller-carrying lever fulcrumed between said jaws and extending inward beneath the bracket, a pressure-roller journaled in the inner end of the roller-carrying lever, an outwardly and upwardly inclined socket on said bracket, a rod passing through the socket and secured to the roller-carrying lever between the pressure-roller and the fulcrum of said lever, and a spring coiled around said rod and bearing against the top of said socket and on the roller-carrying lever, substantially as and for the purpose specified.

PETER E. SHIRK.

Witnesses:
C. G. BASSLER,
WM. R. GERHART.